No. 848,810. PATENTED APR. 2, 1907.
F. B. CONVERSE, Jr.
JUSTIFYING MECHANISM.
APPLICATION FILED SEPT. 5, 1903.

No. 848,810. PATENTED APR. 2, 1907.
F. B. CONVERSE, Jr.
JUSTIFYING MECHANISM.
APPLICATION FILED SEPT. 5, 1903.

Witnesses.
E. B. Gilchrist
J. B. Hull.

Inventor
Francis B. Converse Jr.
By his Attorneys,
Thurston & Bates

No. 848,810. PATENTED APR. 2, 1907.
F. B. CONVERSE, Jr.
JUSTIFYING MECHANISM.
APPLICATION FILED SEPT. 5, 1903.

No. 848,810. PATENTED APR. 2, 1907.
F. B. CONVERSE, Jr.
JUSTIFYING MECHANISM.
APPLICATION FILED SEPT. 5, 1903.

Witnesses.
E. B. Gilchrist
J. B. Hall

Inventor:
Francis B. Converse Jr.
By his Attorneys,
Thurston & Bates

UNITED STATES PATENT OFFICE.

FRANCIS B. CONVERSE, JR., OF CLEVELAND, OHIO, ASSIGNOR, BY MESNE ASSIGNMENTS, TO THE CLEVELAND TYPESETTER COMPANY, OF CLEVELAND, OHIO, A CORPORATION OF OHIO.

JUSTIFYING MECHANISM.

No. 848,810.  Specification of Letters Patent.  Patented April 2, 1907.

Application filed September 5, 1903. Serial No. 172,147.

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Justifying Mechanism, of which the following is a full, clear, and exact description, reference being had to the accompanying drawings.
This invention relates to machines for justifying type of the general class wherein an account is taken of the line shortage and the number of spaces, and from these factors a mechanical computation is made of the proper sizes and number of each size of existing permanent spaces to justify the line.

The object of the present invention is to provide such computing mechanism in a simple and efficient form.
The invention relates particularly to improvements in machines of the form shown in my Patent No. 738,741, issued September 8, 1903, and has reference especially to the portion of the mechanism which in that application I designate as the "fractional-spacing mechanism." In the present drawings only such portions are shown as are necessary to the understanding of the improvements which are the subject of this application.
The mechanism for assembling a line, for taking account of the number of spaces in the line, for advancing the line through the justifier, and for delivering it on the galley being the same in all respects as are shown in my previous application, they are not herein illustrated or described.

Reference-letters, large or small, with exponents, are used throughout this specification to refer to the various parts of the mechanism as follows: A, frame and justifying-channel; B, type and temporary spaces; D, permanent space-case and ejecting mechanism; E, measuring-wedge and operating mechanism; F, gear-rack, plate, and connections; G, gear-shaft and gears; H, fractional spacing-ratchet and parts; J, stepped disk and plunger for locating space-case and cam connections; K, parts connecting space-case with the fractional spacing mechanism; L, line-shaft; M, word-shaft; N, parts giving retrograde movement to the stepped disk.

*Permanent-space case.*—A is the bed-plate upon which stands the vertical frame A', which serves as a main support for the various mechanisms. On the upper edge of this plate is a plate $A^2$, in which is formed a channel $A^3$, hereafter referred to as the "justifying-channel." A line of type B having been assembled with temporary spaces B' of the form shown in Fig. 7 between the words is fed into this channel by any convenient means. A follower $A^5$ in the justifying-channel adjacent to one end of the line of type offers convenient means for engaging the line to advance it through the justifying-channel toward the right in Fig. 3 by any convenient mechanism—such, for instance, as is fully shown in my previous patent referred to. A supply of permanent spaces graded in respect to thickness is carried in a space-case D, which consists of a number of channels D', each adapted to contain a supply of spaces of a definite size. This space-case is of considerable length and may be pivoted at its upper end to some convenient portion of the frame of the machine in such manner that the lower end may be swung through a substantially straight line in a path in front of an ejector $d$. This ejector is guided in the upper part of the bracket $d^{10}$ in line with the lower end of the space-case in such manner that when it is operated it drives a space from the channel of the space-case that may be in line with it through a channel $d^2$ in a space-turning mechanism at $d^3$ to insert it in the line as the line passes through the justifying-channel $A^3$. The spaces are placed in the space-case on their flat sides. My previous patent shows a space-turner placed between the space-case and the justifying-channel to turn the space onto its edge as it is being inserted into the line.

The space-case is located in accordance with the requirements of the line to be justified to cause the ejector to insert the proper size or sizes of spaces by means of mechanism now to be described.

*Line-shortage-dividing mechanism.*—Mechanism is provided for measuring the line to be justified, thereby determining its shortage, which shortage divided by the number of spaces in the line gives the theoretic size of spaces required to justify the line. The mechanism for dividing this shortage by the number of spaces will now be described, the description of the measuring mechanism being deferred, following more logically after the description of coöperating parts.

Figures 2, 6, 7:
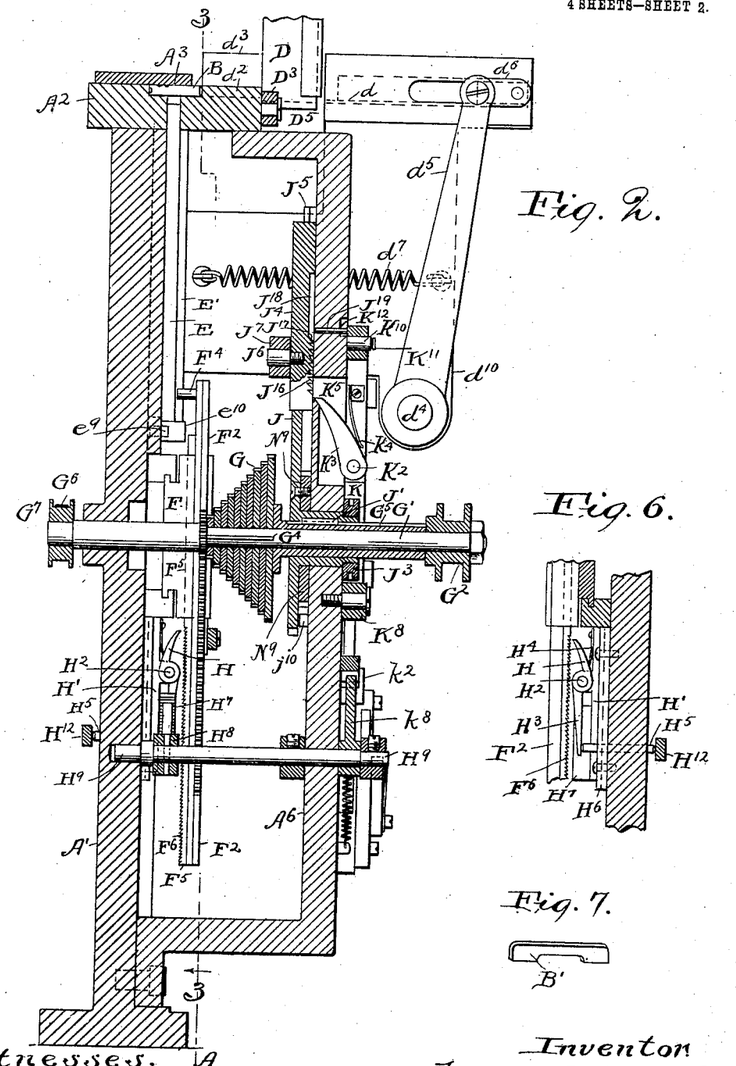
Fig. 2 is a vertical cross-section on line 2 2 of Fig. 1 looking from the left of that figure.
Fig. 6 is a detail, being a vertical section on the line 6 6 of Fig. 3, looking from the right in that figure.
Fig. 7 shows a temporary space used to maintain a separation between the words in a line of type until regular or permanent spaces are substituted.
Figure 3:
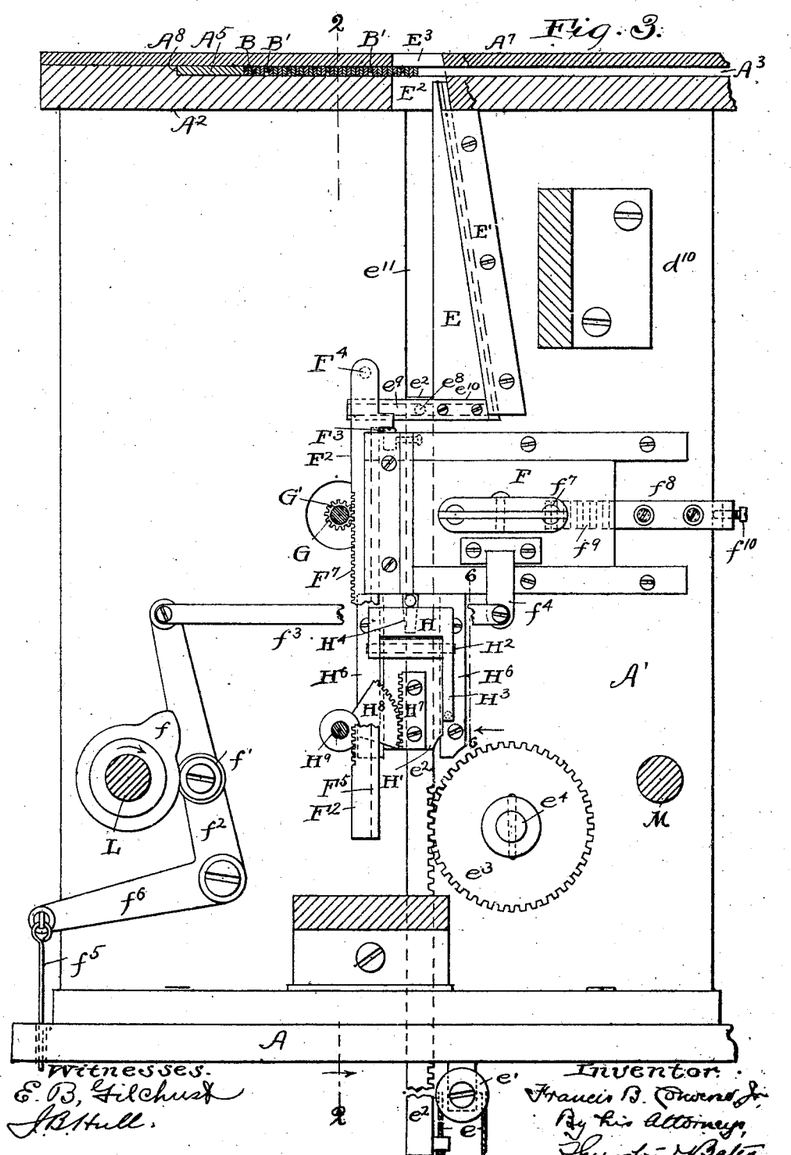
Fig. 3 is a vertical section behind the plane of Fig. 1, being taken on line 3 3 of Fig. 2 looking from the right of this figure.
Figure 4:
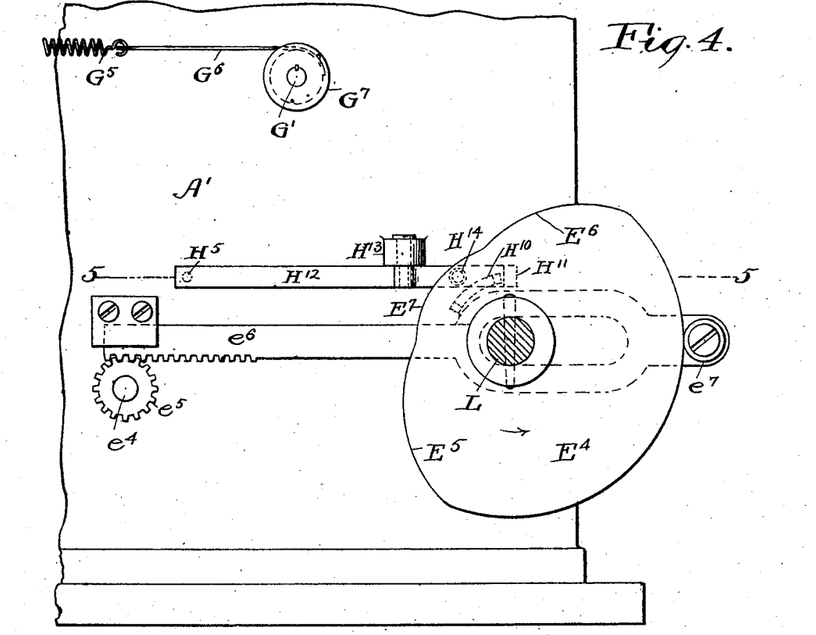
Fig. 4 is a rear elevation of the lower left-hand portion of Fig. 1.
Figure 5:
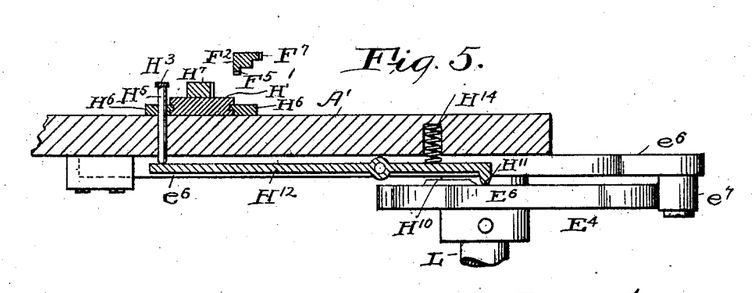
Fig. 5 is a horizontal section on the line 5 5 of Fig. 4.

At the beginning of the justification of each line of type a shaft L, having clutch connection with a source of power, (not shown,) is given one complete revolution. The first operation produced by this shaft to be considered is to locate the plate F and rack-bar $F^2$ in accordance with the number of spaces contained in the line. Space-accounting mechanism for making a record of the number of spaces in the line during its assemblage is fully shown in my previous patent. The plate F and its connection with such space-recording mechanism is in all material respects the same as shown in that patent, and it is here sufficient to explain that the cam $f$, acting upon the roll $f''$ on the lever-arm $f^2$, moves, by means of the link $f^3$ and the bracket $f^4$, the plate F to a zero position toward the right of Fig. 3, whereupon a weight (not shown) on the link $f^5$, acting through the arm $f^6$ of the lever $f^2$, moves the plate F to the left as the decreasing face of the cam $f$ passes the roll. The connection between the plate F and the space-accounting mechanism causes the plate F to be stopped in its movement toward the left at a position dependent upon the number of spaces in the line, a plunger $f^7$ being thrown into engagement with a tooth $f^9$ of a rack $f^8$ (secured to the frame A' behind the plate F and adjusted by a set-screw $f^{10}$) to cause the stoppage. The position shown in Fig. 3 is that assumed by the plate F for a line containing two temporary spaces. For lines containing three, four, five, &c., temporary spaces the plate F would be located one, two, three, &c., teeth $f^9$ of the rack $f^8$ farther to the right. Slidable vertically in the left-hand edge of this plate F is a rack-bar $F^2$, having gear-teeth $F^7$ on its left-hand edge adapted to mesh with one or another of the gears G. These gears G are carried on a shaft G', which has a rotatable and slidable bearing in the frame A' and in the bracket $A^6$, secured at its upper end to the plate $A^2$ and at its lower end to the frame A'. On the forward end of this shaft is a grooved collar $G^2$. A lever $g$, fulcrumed to a standard $g^2$, engages by a pin $g^3$ in its upper end a block $g^4$ in the groove of the collar $G^2$.

Preceding the location of the plate F, as just described, an increasing face $g^5$ of a crown-cam $G^3$, acting upon the roller $g^6$ on the lever $g$, serves to draw the gear-shaft G' and gears G forward to a position slightly to the right of that shown in Fig. 2, drawing all the gears out of the path of the rack $F^2$. While the level face $g^9$ of the cam $G^3$ is passing the roll on the lever $g$ the location of the plate F, as just described, is effected. Following this the decreasing face $g^7$ of the cam $G^3$ permits a spring $g^8$, connected to the lever $g$ and to any convenient point on the frame of the machine, to draw the gear-shaft G' to the rear—that is, to the left in Fig. 2—until one of the gears G meshes with the rack $F^2$, when the overhang of the next larger gear in the series prevents further movement of the shaft.

The gears G are securely fixed to the shaft G' by a key $G^4$ and are held in place by a sleeve $G^5$, which, together with the collar $G^2$, is secured by a nut on the end of the shaft. There is provided a gear for each different possible number of temporary spaces in the lines of type with which the machine is adapted to operate. The diameters of these gears increase in arithmetic ratio with the number of spaces in the line with which they are intended to be used. Thus a gear for a line containing one temporary space would have a radius represented by one. Such line occuring very infrequently, no one-space gear is provided, the smallest gear here shown being for a line containing two temporary spaces. Its radius is equal to two. The next larger gear is for a line containing three temporary spaces, its radius being three, and so on, each succeeding larger gear being designed for lines containing a successively increased number of temporary spaces. The series of gears here shown are for lines containing from two to twelve temporary spaces. The gears are so located on the shaft that when the shaft is in zero position each gear has a tooth centrally located with reference to a horizontal line passing through the center of the shaft.

The rack $F^2$ is accurately adjusted vertically by means of a set-screw $F^3$, permitting the teeth of any one of the gears to come into mesh with the rack, the particular gear thus meshing being determined by the distance of the rack. The selection of the gear required is thus determined by the distance of the rack $F^2$ from the center of the gear-shaft, as located by the action of the space-accounting mechanism as heretofore explained.

*Line-measuring-mechanism.*—The rack $F^2$ having thus been located in engagement with a gear the radius of which is proportionate to the number of spaces in the line, mechanism is now operative to determine the line shortage and to rotate this gear through an angular distance determined by this shortage. This mechanism consists, first, of a wedge E of a definite taper. It is carried by tongue-and-groove connection along its inclined edge by a gib E', its vertical face standing at a distance from the shoulder $A^8$ in the justifying-channel theoretically equal to the length of the required line plus the follower $A^5$, (though practically this distance is slightly greater,) and it is adapted to pass through openings $E^2$ in the plate $A^2$ and $E^3$ in the cover-plate $A^7$. It is apparent that as this wedge rises its vertical edge will advance toward the left, meet the line of type, and compact it against the shoulder $A^8$. Thus the travel of the wedge is dependent upon the line shortage. This wedge is operated at the proper time by a weight (not shown) on a cord $e$, passing over a sheave $e'$, its other end being secured to a rack-bar $e^2$, having teeth engaging with a gear $e^3$ on the shaft $e^4$. This shaft has a bearing in the frame A' and carries on its rear end a pinion $e^5$, meshing with the teeth of a link $e^6$, which is yoked around the shaft L and carries a roller $e^7$, which is operated upon by the cam $E^4$. The upper end of the rack $e^2$ (which extends upward behind the plate F into a groove $e''$) has a pin $e^8$, engaging a slot $e^9$ in the rear side of a bar $e^{10}$, secured to the lower end of the wedge at right angles to its vertical face. Thus as a decreasing face $E^5$ passes the roll $e^7$ the weight on the cord $e$ acts to raise the wedge until stopped by the type, following which the increasing face $E^6$ of the cam $E^4$ acts to draw the wedge down to its initial position. The bar $e^{10}$ as the wedge rises engages a pin $F^4$, projecting from the rear of the upper end of the rack $F^2$. For convenience of construction a slight travel of the wedge is permitted before the bar $e^{10}$ engages the pin $F^4$. After such engagement the rack $F^2$ partakes of the vertical travel of the wedge and operates by its connection with one of the gears G to rotate the shaft G' a distance proportionate to the travel of the wedge—that is, to the amount of the line shortage.

Figure 1:
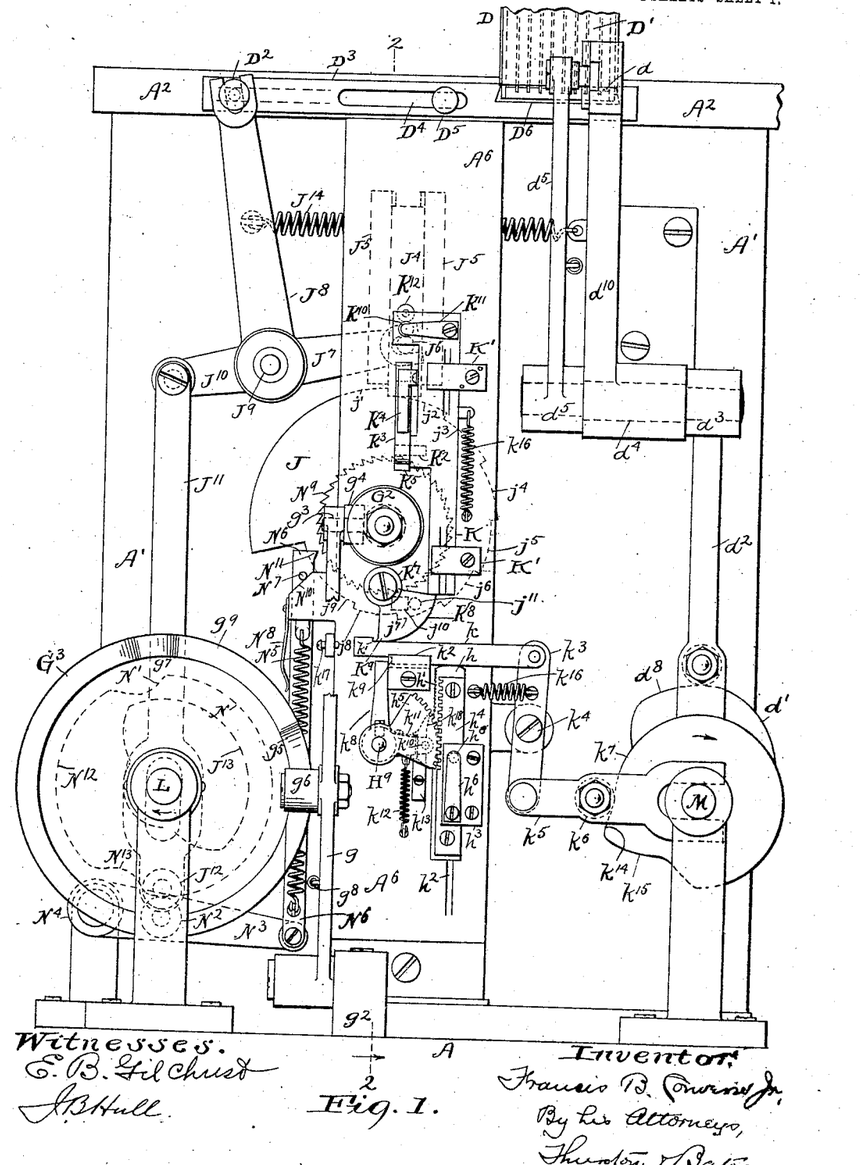
Figure 1 is a front elevation of so much of the justifier as is involved in this application.

*Space-selecting mechanism.*—A stepped disk J of the form shown in Figs. 1 and 2 has a bearing in the bracket $A^6$, being held in place by a nut $J^3$. Through the hub of this disk the sleeve $G^5$ on the shaft G' passes. Sliding movement of the sleeve through this disk is permitted, while independent rotation is prevented by the spline $j'$, extending into a groove in the sleeve. A plunger $J^4$, carried by gibs $J^5$ on the inside face of the bracket $A^6$, is adapted to engage with any one of the faces $j^2$ to $j^9$, which may be brought in line with the plunger when the disk is rotated by the shaft G', as above described. A pin $J^6$, secured to this plunger, engages one arm $J^7$ of a lever $J^8$, fulcrumed on a stud $J^9$. The upper end of this lever $J^8$ yokes around a pin $D^2$ in a bar $D^3$. This bar is guided by a slot $D^4$ and a stud $D^5$ on the forward edge of the plate $A^2$ and engages by means of the notch $D^6$ the lower end of the permanent space-case. The levers $J^7$ and $J^8$ are so proportioned that as the plunger $J^4$ engages the step $j^2$ of the disk J the second channel from the right in the space-case D will be brought into line with the space-ejector $d$. If the plunger $J^4$ engages any one of the steps $j^3$ to $j^9$, the third to the ninth corresponding channel, counting from the right-hand side of the space-case, will be brought into line with the ejector, respectively. The right-hand channel of this space-case contains the smallest size of permanent spaces which are of the same thickness as the temporary spaces, and the channels from right to left each contain spaces one unit thicker than the preceding channel. The unit of difference in the spaces here used is .01 inch. Thus we have spaces .03, .04, .05, &c., to .11 inch in thickness.

Preceding the rotation of the shaft G' and the stepped disk J a cam $J^{13}$, acting on a roll $J^{12}$ on a link $J^{11}$, has drawn down this link to swing the space-case D to a position a short distance to the left of the position shown in Fig. 1, at the same time raising the plunger $J^4$ clear of the path of the disk J, thus permitting the disk to be turned freely.

While a concentric face $E^7$ of the cam $E^4$ is passing the roll $e^7$ on the link $e^6$, which controls the movement of the wedge—that is, while the wedge stands raised to compact the line of type being measured—a decreasing face N' of the cam N passing a roller $N^2$ on a lever-arm $N^3$, fulcrumed to a standard at $N^4$, permits a spring $N^5$, secured between the frame $A^6$ and a link $N^6$, to raise this link to cause it to engage the teeth of a ratchet $N^9$. This ratchet is secured to the face of the disk J. As the link rises a spring $N^8$ causes a pin $N^7$, projecting from the link, to follow the inclined path $N^{10}$ until the nose $N^{11}$ of the link passes into engagement with the ratchet-teeth. In case the upward movement of the wedge has resulted in the rack $F^2$ and the gears G being thrown by momentum somewhat farther than the exact required position this link $N^6$, acting on the ratchet, will rotate the shaft G' backward until the pin $F^4$ is brought down against the bar $e^{10}$, so that the rotation of the shaft G' shall be exactly proportionate to the rise of the wedge. Immediately following this action the cam $J^{13}$ permits the spring $J^{14}$, acting on the lever-arm $J^8$, to draw the space-case D to the right until stopped by the plunger $J^4$, engaging the step of the disk that has been brought beneath the plunger by the rotation of the disk. This action takes place while the concentric portion $N^{12}$ of the cam N is passing the roller $N^2$.

*Fractional spacing mechanism.*—The taper of the wedge E, the radii of the gears G, and the angular lengths of the steps $j^2$ to $j^9$ are so proportioned that for each required unit increase in all of the spaces of the line the disk J shall be rotated through the angular length of one of its steps. The zero position of the parts is indicated in Fig. 1, where the plunger being directly adjacent to the end of the highest step $j'$ of the disk J the smallest size of permanent spaces are required throughout the line for its justification—that is to say, if the line as presented to the action of the measuring-wedge is already of just the required length the wedge will rise until the bar $e^{10}$ just reaches the pin $F^4$, and the parts on the shaft $G'$ will not be moved from the position shown in Fig. 1. This will result in the insertion of the smallest size of spaces into the line, as will hereafter be fully explained. These spaces being of the same size as the temporary spaces, the length of the line will not be varied. If, however, the wedge rises so as to rotate the disk J to such position that the plunger $J^4$ descends upon step $j^3$ directly adjacent to the end of the step $j^2$, spaces each one size larger than the temporary spaces will be required, and this initial position of the selecting mechanism will result in the substitution of the second size of spaces. If, however, the disk J is rotated so that the plunger descends upon any step at some point intermediate of the length of that step, it indicates that the line cannot be justified by the insertion of a single size of spaces throughout, but that a certain number of spaces of a size dependent upon the particular step engaged must be used and the remainder of the spaces must be of the next size smaller. The amount of the step that has passed from beneath the plunger indicates for any particular number of spaces in a line the number of spaces required of the size corresponding to that step. The mechanism for making this change from one size of spaces to another at the proper point in the justification of the line I term "fractional spacing mechanism," which I will now describe.

Formed on a tongue $F^5$, projecting from the rear side of the rack $F^2$, are ratchet-teeth $F^6$ of the form shown. The length of these teeth bear a definite relation to the ratio existing between the dimensions of the other parts and is such that when the rack $F^2$ is in engagement with the two-space gear if the disk J is rotated through the angular length of one of its steps the rack will be moved through the length of two of these teeth. It therefore follows, since the radii of these gears increase in an arithmetic ratio, that when the rack is in engagement with any gear and the disk is rotated through the length of one of its steps the rack will be moved through the length of a number of ratchet-teeth corresponding to the number of the gear in mesh with the rack.

The disk J having been located beneath the plunger $J^4$, as above fully described, in exact accordance with the rise of a measuring-wedge, while the concentric portion $N^{12}$ of the cam N is passing the roll $N^2$ the cam $J^{13}$ permits the space-case D to be swung to the right until the plunger $J^4$ descends upon the step beneath it. This plunger may stand at any point upon the length of the engaged step. Following this action a second decreasing face $N^{13}$ of the cam N permits the link $N^6$ to rise under the influence of the spring $N^5$, causing its nose $N^{11}$ to again engage the ratchet $N^9$ to rotate the disk J until it is stopped by the end of the step adjacent to the one occupied by the plunger engaging the side of the plunger. This retrograde movement of the disk J is communicated, through the shaft $G'$ and the gear G, engaged by the rack $F^2$, to this rack $F^2$, resulting in the rack being lowered an amount dependent, first, on the extent of the retrograde movement of the disk J, and, second, on the number of the gear in mesh with the rack.

Located directly behind the rack $F^2$ and pivoted at $H^2$ to a block $H'$ is a pawl H, of sufficient width to engage the ratchet-teeth $F^6$ in whatever position this rack may have been located by the plate F. The block $H'$ has a slidable bearing in the gibs $H^6$ and carries a gear-rack $H^7$ in mesh with a gear-segment $H^8$, secured to a shaft $H^9$, which shaft has bearings in the frame $A'$ and in the bracket $A^6$. An arm $H^3$, integral with the pawl H, acted upon by a pin $H^5$, passing through the frame $A'$, holds the pawl out of the path of travel of the ratchet-teeth $F^6$ against the tension of the flat spring $H^4$.

Just previously to the last-described upward movement of the link $N^6$ to rotate the disk J in the retrograde direction a cam projection $H^{10}$ on the cam $E^4$, passing against the nose $H^{11}$ of a lever $H^{12}$, fulcrumed at $H^{13}$, presses back this end of the lever against the spring $H^{14}$, releasing the pin $H^5$ to permit the pawl H to be pressed forward by the spring $H^4$ into engagement with the teeth $F^6$. Thus it results that the block $H'$ will be depressed by an amount equal to the downward movement of the rack $F^2$ as the disk J is rotated in a retrograde direction. This movement being completed, the cam projection $H^{10}$ passes from in front of the nose of the lever $H^{12}$, permitting the spring $H^{14}$, acting through this lever on the pin $H^5$, to release the pawl H from the teeth $F^6$.

On the front side of the bracket $A^6$ is a slide $h$, having on one side near the upper end ratchet-teeth $h'$ of the same size as the teeth $F^6$ in the rack-bar $F^2$. This slide is guided by a tongue in a groove $h^2$ and held in place by a gib $h^3$. Secured to the front of this slide is a rack-bar $h^4$, having gear-teeth to mesh with a gear-segment $h^5$, secured to the forward end of the shaft $H^9$, above referred to. The radius of this gear-segment is the same as the radius of the gear-segment $H^8$. It therefore results that as the pawl H is depressed, as above described, the slide $h$ is lowered an equal amount. The pin $h^8$, passing through the gib $h^3$ and pressed upon by a flat spring $h^6$, creates sufficient friction to hold the slide $h$ in the position to which it is moved. This downward movement of the slide $h$ is for any particular gear G engaged proportionate to the amount of the step of the disk J, which had passed beyond the plunger in the initial positioning of the disk. It follows from this relation, as is hereinafter fully illustrated, that if this slide $h$ be fed upward an amount equal to the length of one of its ratchet-teeth $h'$ for the insertion of each permanent space into the line it will be returned to its initial position when the required number of the size of spaces corresponding to the step engaged have been inserted into the line. Mechanism will now be described for causing a change to the next thinner size of spaces by the return of this bar to its initial position.

A bar K, guided by the gibs $K'$, carries on a stud $K^2$ a pawl $K^3$, which is pressed by a spring $K^4$ through an opening $K^5$ in the bracket $A^6$ toward ratchet-teeth $K^6$, formed on the forward side of the plunger $J^4$. These teeth are spaced apart a distance equal to the height of the steps on the disk J. The pawl $K^3$ is normally held out of engagement with the teeth $J^{16}$ by the back wall of the opening $K^5$. Fulcrumed at $K^7$ is a piece $K^8$, which is, in effect, a bell-crank lever having one arm beneath the end of the bar K and having formed on the side of the other arm an angular projection $K^9$, adapted to be engaged by a corresponding projection $k'$ on the upper side of a bar $k$. This bar $k$ is loosely guided by a gib $k^2$ and is connected with the upper end of a lever-arm $k^3$, which is fulcrumed at $k^4$, and connected at its lower end with a link $k^5$, carrying a roll $k^6$, adapted to be acted upon by a cam $k^7$. Loosely journaled on the forward end of the shaft $H^9$, behind the gear-segment $h^5$, is a bell-crank lever $k^8$, the upper end of which stands in the path of a shoulder $k^9$, formed on the under side of the bar $k$. The other arm of this lever carries a pawl $k^{18}$, fulcrumed at $k^{10}$ and pressed forward toward the rack-teeth $h'$ by the flat spring $k^{11}$. This arm is held in the position shown by the spring $k^{12}$, the beveled end of a piece $k^{13}$ serving to coöperate with a corresponding bevel on the pawl to hold the pawl out of engagement with the teeth $h'$.

A shaft M, (hereafter referred to as the "word-shaft,") carried in suitable bearings, is given one revolution for the insertion of each permanent space into the line in place of the temporary spaces. It carries a cam $d'$, which, acting through a link $d^2$, lever $d^3$, shaft $d^4$, lever $d^5$, link $d^6$, permits the advancement of the ejector $d$ at the proper time under the action of the spring $d^7$ to shove a space from the space-case into the line. The cam $k^7$ being on this same shaft gives the bar $k$ a backward-and-forward movement for each space inserted into the line.

It will now be explained how the parts just described operate to cause the selection of a certain number of one size of spaces and then shift the space-case to the next thinner size during the insertion of spaces into the line. It was shown that with a line containing temporary spaces—that is, of just the proper length before justification—the disk J will not be moved by the measuring-wedge from the position shown in Fig. 1. At the commencement of the insertion of spaces into this line (the line being advanced along the justifying-channel, past the space-insertion point, and stopped intermittently for the insertion of the spaces by mechanism in operative connection with the shaft M, as fully shown and described in my previous patent) the parts will all have the position shown in Fig. 1. The rotation of the shaft M being in the direction indicated by the arrow, before the concentric face $d^8$ of the cam $d'$ has passed from beneath the roll on the link $d^2$ the increasing face $k^{14}$ of the cam $k^7$ would throw the link $k^5$ to the left, drawing the bar $k$ to the right. The projection $k'$ of this bar meeting the projection $K^9$ would swing the part $K^8$ to cause the bar K to be lifted. As it rises the pawl $K^3$ will drop into the first tooth of the plunger $J^4$ and lift this plunger to the extent of one tooth. At the same time the pin $K^{10}$, carried by the bar K and pressed upon by a flat spring $K^{11}$, will spring into a recess $K^{12}$ in the bracket $A^6$, maintaining this bar K and the plunger $J^4$ in the elevated position, causing the first channel of the space-case D to be alined with the plunger $d$ to cause the insertion of the first or smallest size of spaces throughout this line. The strokes of the bar $k$ thereafter in the operations upon this line will be idle. Ordinarily, however, the initial setting of the disk J will be such that the link $N^6$ will give it a certain amount of retrograde movement, resulting in the proportionate depression of the slide $h$. As the slide is depressed the bar $k$ is permitted to drop until it rests upon the gib $k^2$, which brings the projection $k'$ out of the path of the part $K^8$. Hence as the shaft M commences to rotate the increasing face $k^{14}$ of the cam $k^7$ gives the bar $k$ a movement toward the right which is productive of no effect. Following this movement the cam $d'$ permits the insertion of a space into the line by the action of the ejector $d$, during which operation the decreasing face $k^{15}$ of the cam $k^7$ permits the bar $k$ to be drawn to the left under the action of a spring $k^{16}$, the extent of its movement being limited by a set-screw $k^{17}$. In making this movement the shoulder $k^9$ meets the upper end of the bell-crank lever $k^8$, raising the pawl $k^{18}$ to cause it to elevate the slide $h$ an amount equal to the length of one of its teeth $h'$. This operation will be repeated for each space inserted into the line until the bar $h$ is thereby raised to its initial position. Following the stroke to the left of the bar $k$, which brings the slide $h$ to its initial position, the stroke of the bar $k$ to the right engages the part $K^8$, thereby shifting the space-case to cause the insertion of the next smaller size of spaces throughout the remainder of the line. The succeeding strokes of the bar $k$ are thereafter idle.

The relations which exist in this mechanism may be made clear by considering their operations on lines of a definite number of temporary spaces and of a given line shortage. I will explain its operation in connection with lines assumed to contain seven temporary spaces. The action of the mechanism for any line which is of just the required length before justification has already been explained. Suppose, however, this line containing seven temporary spaces is .07 inch short. As fully explained, the proportions existing in the measuring-wedge, gears, and the disk J are such that the travel of the wedge in measuring this line will rotate the disk J the length of one step, bringing it to rest with the end of the step $j^2$ in line with the edge of the plunger $J^4$. The plunger therefore descends upon the step $j^3$, swinging the space-case to the right to bring the third channel in line with the ejector. The end of the step $j^2$ being against the side of the plunger $J^4$ the disk is not permitted any retrograde movement. The slide $h$ is therefore not lowered, and the first stroke of the bar $k$ toward the right as the word-shaft begins to rotate causes the bar K to be lifted, swinging the space-case to the left the width of one channel. This brings the required second size of spaces in line with the ejector, which size, each .01 inch thicker than the temporary spaces, will be substituted for the temporary spaces, increasing the line the required .07 inch. If, however, this line containing seven temporary spaces were .01 inch short, the disk J would be rotated through one-seventh of the length of a step, the plunger descending on the step $j^2$ one-seventh of the length of the step from the end of step $j'$. The disk thereafter being rotated backward by the link $N^6$ until stopped by the plunger, this retrograde movement, acting through the number seven gear and the rack $F^2$, the pawl H, and connecting parts, lowers the slide $h$ the length of one of the teeth $h'$, permitting the bar $k$ to make one idle stroke. The first space, therefore, will be inserted into the line with the plunger $J^4$ resting on the step $j^2$, which causes the selection of the second size of space. During the insertion of this space the pawl $k^{18}$ elevates the slide $h$ and the bar $k$ to their original positions, so that at the commencement of the second rotation of the word-shaft the space-case will be shifted to the left, causing the remaining spaces in the line to be of the smallest size. The spaces inserted, therefore—one of the second size and six of the smallest size—will have increased the length of the line .01 inch, the required amount. To take one more illustration, suppose this seven-space line is .38 inch short. If it were just .35 inch short, the plunger would come to rest on the step $j^7$ adjacent to the end of the step $j^6$. If it were .42 inch short, the plunger would rest adjacent to the end of the step $j^7$. Being .38 inch short—that is, three-sevenths of the difference between these two previous shortages—three-sevenths of the step $j^7$ will pass beneath the plunger $J^4$. The retrograde movement of the disk J will cause a depression of the slide $h$ equal to the length of three of the teeth $h'$. The word-shaft beginning to operate, the first stroke to the right of the bar $k$ will be idle. The space inserted in the line is of a size corresponding to the step $j^7$—that is, .09 inch. During the insertion of this space the slide $h$ is elevated one tooth. The second stroke of the bar $k$ to the right is idle, and the second space is .09 inch. The slide $h$ is again elevated, (a total elevation of two teeth,) and the third stroke of the bar $k$ is idle, the third space being the same size. During its insertion the bar $h$ is elevated a third time, which brings it back to its initial position. Therefore preceding the insertion of the fourth space the bar $k$ will cause the space-case to be moved one channel to the left, causing the insertion throughout the rest of the line of spaces one size smaller—namely, .08 inch. It appears, therefore, that three spaces each .09 inch and four spaces each .08 inch, making a total of .59 inch, have been inserted in the line in the place of seven temporary spaces each .03 inch, or a total of .21 inch. The line has therefore been extended the difference between this .21 inch removed and the .59 inch inserted, or .38 inch.

The disk J can never be rotated in the retrograde direction a distance greater than the length of one of the steps. Therefore the slide $h$ is never lowered a distance greater than the aggregate length of a number of teeth $h'$ equal to the number of spaces in the line. The slide $h$ and the pawl H will always be returned to their initial position, as shown in Figs. 1 and 2, during the operations of the word-shaft M, it being understood that this shaft rotates once for each space in the line.

At the conclusion of the justification of any line all the parts are left standing in the position which they may have then assumed until the line-shaft L is again rotated for the succeeding line. With the commencement of the rotation of the shaft the crown-cam $G^3$ moves the gears G to the right in Fig. 2 until they shall all have cleared the path of the rack F², At the same time the cam J¹³, drawing down on the link J¹¹, swings the space-case D to its extreme left-hand position, at the same time elevating the plunger J⁴ to clear the steps of the disk J. As the plunger rises the beveled bottom J¹⁷ of a notch J¹⁸ in this plunger engages a pin J¹⁹, which was projected into this notch when the pin K¹⁰ dropped into the seat K¹², thereby pressing the pin K¹⁰ out of the seat K¹², permitting the spring K¹⁶ to lower the bar K. The gears being released from the rack and the disk from the plunger J⁴, a spring G⁵, attached to a strap G⁶, wound on a drum G⁷ on the shaft G′, rotates the shaft G′ and all its connecting parts back to its zero position until stopped by a pin j¹¹, projecting from the side of the disk J, engaging a lug j¹⁰, secured at the proper point on the inside of the bracket A⁶. The parts are all thereby brought to a zero position to take up the operations of measuring the new line.

I claim—

1. In a justifying mechanism, in combination, a member placed according to the line shortage and the number of spaces, mechanism for controlling the size of permanent spaces to be in the justified line, a connection between said mechanism and said member, mechanism located according to two factors one of which is the gap between a certain point on said member and such connection, and the other of which is the number of spaces, and mechanism for periodically moving the last-mentioned mechanism to eventually cause change of size of space selected.

2. In a justifying mechanism, in combination, a stepped member, means for controlling the size of permanent spaces to be in the line, a connection between the same and said member, means for measuring the distance between the said connection and the end of a step in said member, mechanism controlled by said measurement and the number of spaces for governing the fractional spacing.

3. In a justifying mechanism, in combination, means for determining the size of permanent spaces, mechanism for giving said means a primary setting, mechanism for measuring the amount which said primary setting is out of position for all the spaces to be of one size, and mechanism governed by said measurement and by the number of spaces, for shifting at the proper time the space-controlling mechanism.

4. In a justifying mechanism, in combination, means for determining the size of permanent spaces, mechanism for giving said means a primary setting, mechanism for measuring the amount which said primary setting is out of position for all the spaces to be of one size, a member placed according to said measurement and the number of spaces, and means for thereafter periodically moving said member to cause at the proper time a change in the size of permanent space selected.

5. In a justifying mechanism, in combination, means for determining the size of permanent spaces, mechanism for primarily setting the same, mechanism for measuring the amount which said primary setting is out of position from that where all the spaces would be of the same size, a member displaced according to said measurement and the number of spaces, means for periodically replacing said member by equal movements for each space inserted, and means, governed thereby for varying the size of space selected.

6. In a justifying mechanism, in combination, means for determining the size of permanent spaces, mechanism for primarily setting the same, mechanism for measuring the amount which said primary setting is out of position from what it would be if all the spaces were to be of one size, a member placed according to said measurement and the number of spaces, means for periodically moving said member, and mechanism whereby when said member reaches a predetermined position a portion of the space-determining means is caused to be shifted.

7. In a justifying mechanism, in combination, a movable space-case, a stepped member, a connection from the steps of said member for controlling the size of permanent spaces to be in the line, mechanism displaced according to two factors, one of which is the gap between such connection and the end of the step engaged thereby, mechanism placed according to said measurement and the number of spaces, means for moving said mechanism in periodic steps, and means whereby when the same reaches a predetermined position the space-case is adapted to be shifted.

8. In a justifying mechanism, in combination, a stepped member, means for placing the same according to the line shortage and the number of spaces, a connection from the steps of said member for controlling the size of permanent spaces to be in the line, mechanism displaced according to two factors, one of which is the gap between such connection and the end of a step and the other the number of spaces, mechanism for returning said displaced member in periodic steps, mechanism adapted to be actuated by said member when returned to vary the size of permanent spaces.

9. In a justifying mechanism, a member placed according to the line shortage and the number of spaces, mechanism adapted to engage the same for determining the size of permanent spaces to be in the line, mechanism for shifting said member to take up the gap between a certain point thereon and said mechanism, a second member, mechanism for displacing it proportionately to the shifted distance of the first-mentioned member multiplied by the number of spaces, mechanism for returning said displaced member, and mechanism adapted to be controlled by the displaced member for changing the size of permanent spaces.

10. In a justifying mechanism, the combination, of a stepped member, means for primarily setting the same according to the line shortage and the number of spaces, a plunger adapted to engage a step of said member, means connected with said plunger for controlling the size of permanent spaces to be in the line, mechanism for measuring the gap between said plunger and the end of the step on which the plunger rests, and mechanism varied by said measurement and the number of spaces for causing change in size of the permanent spaces selected.

11. In a justifying mechanism, in combination, a stepped member primarily placed according to the line shortage and the number of spaces, a plunger adapted to engage a step of said member, means connected with said plunger for placing permanent spaces, means for moving said stepped member to take up the gap between the plunger and the end of the step on which the plunger rests, means located according to said movement of the stepped member and the number of spaces, and mechanism for periodically moving said means to govern the fractional spacing.

12. In a justifying mechanism, in combination, a stepped member, means for primarily setting it according to the line shortage and the number of spaces, means for controlling the size of permanent spaces to be in the justified line connected with a step of said member, mechanism for giving said member a secondary movement to take up the gap between such connected means and the end of the step which it engages, a member displaced according to such movement and the number of spaces for justification, means for replacing said displaced member periodically during justification, and mechanism adapted to be operated by said displaced member for changing the size of permanent spaces.

13. In a justifying mechanism, the combination of a series of gears of radii increasing with the number of spaces, means for selecting a gear corresponding to the number of spaces, a rack adapted to engage such selected gear, means for moving it according to the line shortage, space-placing means, a connection between the same and said series of gears, means for thereafter giving said series of gears another movement dependent upon the distance between certain points of said connection, and mechanism now in connection with the selected gear for determining the fractional spacing.

14. In a justifying mechanism, the combination of a series of gears of radii increasing with the number of spaces, means for selecting a gear corresponding to the number of spaces, a rack adapted to engage such selected gear, means for moving it according to the line shortage, space-controlling means, a connection between the same and said series of gears, means for giving said series of gears another movement dependent upon the distance between certain points of said connection, means now in connection with the selected gear (and hence moved according to the factors of the last-mentioned movement and the number of spaces) mechanism controlled by said means for determining the fractional spacing, means for periodically moving said mechanism, and means adapted to be actuated by said mechanism for shifting the space-controlling means.

15. In a justifying mechanism the combination of a series of gears of radii increasing with the number of spaces, means for selecting a gear corresponding to the number of spaces, a rack adapted to engage such selected gear, means for moving it according to the line shortage, space-controlling means, a connection between the same and said series of gears, means for thereafter giving said series of gears another movement dependent upon the distance between certain points of said connection, in connection with the selected gear at the time of the last-mentioned movement, mechanism located by said last-mentioned means, means for shifting said mechanism, and means adapted to be actuated by said mechanism when it reaches a predetermined position for changing the size of space, said shifting being accomplished periodically during the justification by movements individually independent in amount of the number of spaces.

16. In a justifying mechanism, the combination of a series of gears of radii increasing in arithmetic ratio, a stepped disk connected with said gears, means for selecting for action a gear dependent on the number of spaces in the line, means for moving such gear according to the line shortage, a plunger adapted to rest upon a step of the disk so placed, mechanism for controlling permanent spaces connected with said plunger, means for thereafter rotating said disk to take up the gap between said plunger and the end of the step on which the said plunger rests, a rack connected with the selected gear, a member adapted to be connected with said rack and hence displaced according to the movement thereof, means for alternately placing the selected spaces in the line and returning said member to initial position by definite equal movements, and mechanism actuated by said member when it reaches initial position to cause the space-controlling means to shift.

17. In a justifying mechanism, the combination of a series of gears whose radii increase in an arithmetic series, a stepped member connected therewith and adapted to rest on a step of said member, a rack, means for causing same to mesh with the gear corresponding to the number of spaces, means for thereafter moving said rack according to the line shortage, fractional-spacing mechanism, means for bringing it into engagement with said rack after the primary location of said stepped member, means for thereafter moving said gears according to the distance between said plunger and the end of the step on which it rests.

18. In a justifying mechanism, the combination of a stepped member, space-placing means, a plunger connected therewith and adapted to rest on a step of said member, a series of gears whose radii increase in an arithmetic series, a rack, means for causing same to mesh with the gear corresponding to the number of spaces, means for thereafter moving said gears according to the distance between said plunger and the end of the step on which it rests, a member of the fractional-spacing mechanism, adapted to be displaced by said rack, means for periodically during the justification replacing said member by definite steps individually independent of the number of spaces, and mechanism thrown into action when said member reaches its initial position for causing a shifting of the space-placing means.

19. In a justifying mechanism, in combination, means for determining the size of permanent spaces, mechanism for setting said means, mechanism for measuring the amount which such setting is out of position from what it would be if all the spaces were to be of one size, a series of gears of varying radii, a rack, means for causing the same to mesh with a gear selected according to the number of spaces, means for rotating said gear according to such measurement, and fractional-spacing mechanism governed by said rack.

20. In a justifying mechanism, in combination, a series of gears of radii increasing arithmetically, a stepped member connected therewith, a plunger adapted to rest on a step of said member, a space-case, a connection between the same and said plunger, a rack, means for causing it to mesh with a gear selected according to the number of spaces, means for thereafter moving the rack according to the line shortage, a fractional-spacing member, means for thereafter establishing a connection between it and said rack, means for thereafter rotating said gears to take up the gap between said plunger and the end of the step on which it rests, means operating once for each space to return the displaced member of the fractional-spacing mechanism to initial position by steps equal in amount, mechanism connected with the space-case and adapted to shift it, and means for actuating said last-mentioned mechanism when said displaced member has been returned to its initial position.

21. In a justifying mechanism, in combination, a member having a series of steps, one for each size of permanent space, means for moving it in one direction according to the number of spaces and the line shortage, and means for thereafter moving it in the other direction to locate the fractional-spacing mechanism.

22. In a justifying mechanism, in combination, a stepped member, means for placing it according to the number of spaces and the line shortage, and means for thereafter moving it to bring it into the position it would occupy if the spaces were all of the same size, and fractional-spacing mechanism varied by said movement.

23. In a justifying mechanism, in combination, a member having a series of steps, means for moving it in one direction according to the number of spaces in the line and the line shortage, and means for thereafter moving it in the opposite direction to govern the fractional spacing.

24. In a justifying mechanism, in combination of a single series of steps for justifying lines of varying number of spaces, there being one step for each size of permanent spaces, means for moving said series of steps lengthwise of a step according to the number of spaces and the line shortage, and means for thereafter moving said series in the direction of the length of a step to govern the fractional spacing.

In testimony whereof I hereunto affix my signature in the presence of two witnesses.

FRANCIS B. CONVERSE, Jr.

Witnesses:
ALBERT H. BATES,
B. W. BROCKETT.